Jan. 26, 1960 F. NATHAN 2,922,716

PROCESS OF AND APPARATUS FOR PREPARING PHOTO-ENGRAVED PRINTING PLATES

Filed Feb. 11, 1954

INVENTOR.
Frederick Nathan,
BY
L. S. Saulsbury
his ATTORNEY.

United States Patent Office 2,922,716
Patented Jan. 26, 1960

2,922,716

PROCESS OF AND APPARATUS FOR PREPARING PHOTO-ENGRAVED PRINTING PLATES

Frederick Nathan, Bronx, N.Y.

Application February 11, 1954, Serial No. 409,674

2 Claims. (Cl. 96—36)

This invention relates to a process of and apparatus for preparing photo-engraved printing plates.

With the present day photo-engraving or etching process, the image is transferred to zinc or copper plates from a negative with light sensitive solutions that, when exposed to light and developed, become acid resistant. The zinc or copper plate with the image is placed in an acid bath to effect the first bite or etching step. After the etching of the plate has continued for a short time, the plate is removed from the acid bath, cleaned and dried and then powdered in the usual manner with an etching powder. The powder is brushed into the crevices made by the acid and is banked into the sides thereof and against the unetched acid resistant portions of the plate. After the powder has been well distributed, the plate is heated to a temperature sufficient to melt the powder and make it acid resistant so that when the next etching operation is effected, the side of the unetched portion such as a line or dot is protected and to prevent an uncutting and destruction of the unetched portion when the plate is again submitted to the acid bath.

The burning or heating of the plate to treat the powder is ordinarily done on an open gas stove, gas oven, electric oven and without control of the temperature, and as a result the powder is often underburned or overburned so that the unetched portion is unprotected or filled in due to poor heat control and so that with the next etching operation the unetched portions are undercut, spoiled, left uneven with the result that a poor printing plate is provided. The printing plates become warped and distorted and are not suitable for color, half-tone processes where several colors are to be used, since the printing portions would not be brought into proper registry with one another.

It is accordingly an object of the present invention to provide a more satisfactory printing plate wherein the etching process will not effect an undercutting or chewing of the unetched and acid resistant portions.

It is another object of the invention to provide in the process of preparing photo-engraved plates the step of heating the plate from the top thereof than from the underside and in a manner wherein the baking of the powder will be kept upon the sides of the unetched portions, unburned and unharmed.

It is another object of the invention to provide in the process of preparing a photo-engraved plate the step of applying the heat by convection directly to the surfaces or top of the plate while retaining the printing plate between expansion plate members, and while retained under pressure in an appropriate press device.

It is another object of the invention to provide an apparatus for heating printing plates wherein the heating temperature and amount of heat supplied to the printing plate can be absolutely controlled.

Other objects of the invention are to provide a heating apparatus adapted for heating printing plates, which is of simple construction, inexpensive to manufacture, has a minimum number of parts, durable and has long life, easy to apply to the printing plate, efficient and effective in use.

For a better understanding of the invention, reference may be had to the following detailed description taken in connection with the accompanying drawing, in which.

Figure 1:
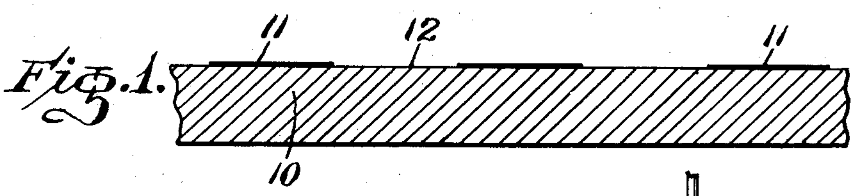
Figure 1 is a fragmentary sectional view of a printing plate on which an image has been photographed.
Figures 2, 3:
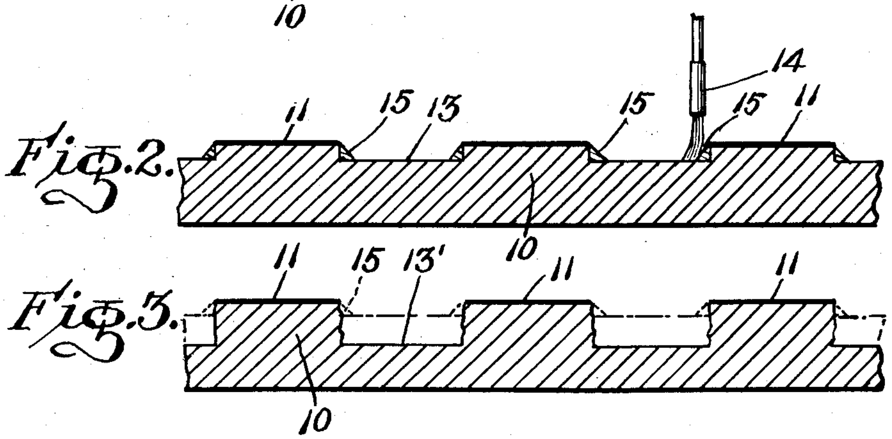
Fig. 2 is a fragmentary sectional view of a printing plate after the same has been powdered with a brush and etched.
Figure 3 is a fragmentary sectional view of the plate after the second etching operation has been effected upon the plate.

Referring now particularly to Figs. 1, 2 and 3, certain steps of the etching process will be described. A thin printing plate 10 formed of zinc or copper has a thickness of about sixteen gauge covered with a light sensitive solution and an image is transferred to the surface thereof from a negative. This solution upon being exposed and developed becomes acid resisting. These acid resisting layers or images are indicated at 11. Between these areas the metal of the plate is exposed as indicated at 12. With this plate so formed, it is placed in an acid bath, and etched recesses 13, Fig. 2, are provided in the areas lying between the acid resistant areas 11. The length of time which the plate stays in the acid bath depends upon the depth of cut to be made, whether for coarse or fine quality work, half-tone or line. The acid resistant coatings 11 will prevent the portions thereunder from being etched during this acid treating operation.

The acid bath is formed of nitric acid when the plate is of zinc. Where the plate is of copper, a solution of 38 degrees Baumé per chloride ion is used. With these different etching solutions, the first bite is taken and made upon the surface of the plate.

If 120-line half-tone is to be provided on zinc, the plate is exposed to the acid consisting of 14 parts of water and one part nitric acid for a period of eight to ten seconds to thereby give a depth of approximately .001 of an inch. If 120-line or half-tone is to be provided on copper, the copper plate is exposed in the 38 degree Baumé per chloride ion for a period of sixty seconds for the same depth and to provide the first bite.

After taking this first etching bite and cleaning the plate, the plate is powdered with etching powder or dragon's blood. This powder is spread on the surface in the conventional four directions by an appropriate brush 14. This powder is swept into the sides of the depressions or recesses 13 to fill the same in the manner as indicated at 15. Thereafter, the plate is heated to sufficient temperature to melt the powder and provide in the sides of the recess an acid resistant substance to protect the side of the line or dot 11 so that upon the next etching operation the line or dot will not be impaired. With the open stoves the heat is applied from under the plate and upon this process and method of heating, zinc plates become warped, distorted and the burning of the powder is not done accurately and evenly. The plates are thus rendered unsuitable for color half-tone process work where four or more colors have to be brought into printing register. The printing portions 11 with the prior heating apparatus become undercut, chewed or provided with a shoulder. To overcome this problem, there has been provided an apparatus indicated generally at 16 whereby the heat is applied by convection directly to the surface or top of the plate. This heating apparatus 16 comprises a heating unit 17 having two plates 18 and 19 between which is disposed an electric heating coil 20 that has its ends connected to exterior terminals 21 and 22 to which current is delivered by feed wires 23 and 24 respectively. This heating unit 17 is fitted into a recess 25 of the solid thick plate 26 of aluminum alloy.

The printing plate, when being heated and having already been powdered, as shown in Fig. 2, is placed upon a lower expansion plate 28 after first covering the same with a film of oil 30' with the top recessed surface being up. Upon this top surface there is placed an upper expansion plate 29 on which a film of oil 30' is provided for engagement of the upper expansion plate by the bottom surface of the heating apparatus 16.

The assembly is then applied by pressure plate 31 with pressure with the lower expansion and support plate being rested on a pressure applying plate 32. Pressure is then effected with these plates 31 and 32 and the heating apparatus 16 and supporting plates are pressed tightly against the plate being treated, as indicated by arrows 33 and 34. The upper expansion plate 29 is brought tightly against the etched surface of the printing plate 10. Heat is transmitted from the electric heating unit 17 through the solid metal plate, the upper expansion plate and is delivered directly by convection to the top surface of the printing plate while the printing plate is being kept under pressure.

The oiling of the top of the expansion plate and the top of the lower expansion plate is to allow work plate 10, upper expansion plate 29 and lower expansion plate 28 to expand as a whole unit, thus protecting the coated and acid resisting surfaces of the printing plate 10, eliminating scratches, sears and so forth. As only a low pressure of ten or fifteen pounds per square inch are needed for contact plates 10, 28 and 29, the plates will readily expand between the oiled surfaces.

During this time the pressure is being maintained, on the assembly, by means of the pressure plates 31 and 32. The heat may be absolutely controlled; by a series of resistances to within a few degrees of temperature whereby to apply the exact amount of heat necessary to burn the etching powder equally, evenly and without burning the etching plate. The plate will not warp or be scorched. Accordingly, a satisfactory acid resistant fused powder, resulting from the heating operation is provided about the sides of the recess, as shown in Fig. 2. Since the conventional powdering is four ways, the printing plate is heated after each powdering or four times to protect all sides of lines and dots. The printing plate is thus prepared for the next etching operation.

Figures 4, 5, 6:
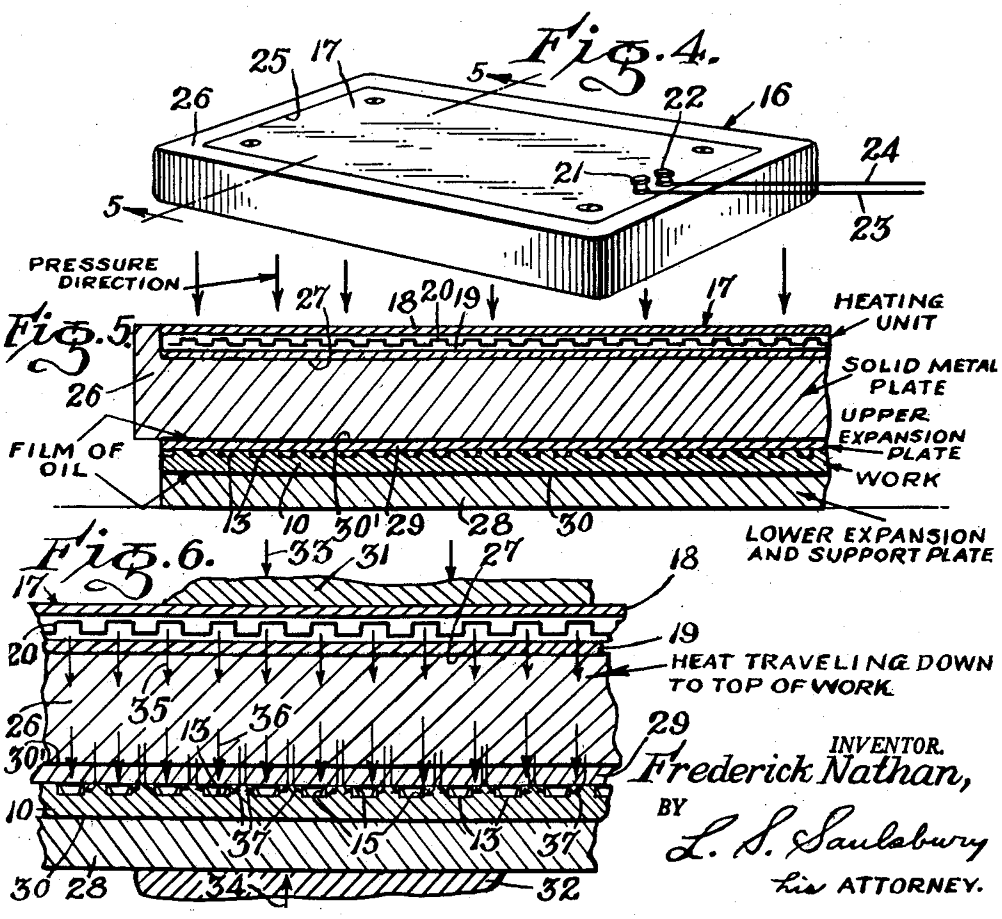
Fig. 4 is a perspective view of the apparatus used for heating the top surface of the printing plate.
Fig. 5 is a fragmentary sectional view of the apparatus as viewed on line 5—5 of Fig. 4.
Fig. 6 is an enlarged fragmentary sectional view of the heating apparatus and of the printing plate being treated with the heating apparatus and with the heating apparatus and the printing plate being placed under pressure.

Since the powder 15 is not underburned or overburned, a satisfactory and efficient etching operation is had as best illustrated in Fig. 3. The second bite of the etching is made in the same manner as the first bite by dipping the plate into an acid and allowing it to remain at a great time in order that the recess 13 can be deepened as indicated at 13' and the sides of the recess automatically cut as the etching operation is effected. Because of the efficient and even cutting, the projections are neither undercut nor shouldered, chewed or made irregular. It will be noted that the side edges are straight and the acid resistant top areas 11 are maintained and kept uniform. The heat passing through the plate 26 is effected in the direction of the arrows 34 and 35 in Fig. 6, and this heat is held against the top and conveyed to the side of the recess and to powder on the printing plate in the manner as indicated by arrows 37. The powder banks will be uninjured as the heat is conveyed by convection to this powder and consequently even heating of the powder is effected. A thin finished printing plate, as shown in Fig. 3, will result from this process which employs the above described apparatus in the heating step for the plate. The heating apparatus is employed after the first etching and the second etching will follow the heating step until the final printing plate has been made.

It will be apparent that as a result of this method of heating by convection effected by contacting the top of the plate with the heating apparatus, printing plates as thin as .020 of an inch can be etched in four or more colors of half-tone or line or a combination of half-tone and line on zinc and be clean and in perfect register on any size printing plate.

It will be further apparent that temperature and heat control of the plate can be maintained and that the printing plates will not become warped, distorted, shrunk or expanded and retain their original metallic structure especially relating to zinc, aluminum and such metals of low melting points. All etching powders are of low melting temperatures from 180 degrees Fahrenheit to 220 degrees Fahrenheit or thereabout, and it is also apparent that these low temperatures will not upset the original manufactured structure of the metals used in common practice for printing especially when rigid heat control is applicable.

The manner of carrying out the process may be varied, and the heating apparatus used in effecting the process may have detailed changes without departing from the spirit and scope of the present invention as defined by the appended claims.

What is claimed is:

1. The process of producing a photo-engraved printing plate which consists of exposing a printing plate having a photo sensitive coating thereon to light from an image to be printed, developing said exposed plate to render the exposed image areas thereof acid-resistant, subjecting the developed plate to an acid bath to etch the unexposed surfaces, brushing the etched surface with etching powder and distributing the powder over the surface so as to locate the powder against the side walls bordering the etched areas, placing the powdered plate between lower and upper expanding plates, applying heating apparatus over the upper expansion plate for contract therewith to deliver heat thereto, said upper expansion plate being in contact with the unetched surfaces of the printing plate, and disposing the assembly between press plates whereby to hold the assembly in pressed relationship while effecting the flow of heat from the heating apparatus to the expansion plate and from the expansion plate to the photo-engraved printing plate whereby to fix the powder in the etched recesses and prepare the printing plate for a second etching operation, and finally submitting the printing plate to further etching solution.

2. In the production of photo-engraved printing plates, the process of burning-in etching powder located against the shallow side walls bordering the etched areas of an exposed and developed printing plate, the steps comprising sandwiching the powdered printing plate between lower and upper expansion plates thereby effecting physical contact between the upper expansion plate and the etched surface of the printing plate, interposing between said expansion plates and said printing plate lubricating films permitting independent expansion of the printing plate, subjecting said sandwich to pressure to maintain intimate contact between said plates, and transmitting heat to said printing plate through said upper expansion plate to burn in the powder.

References Cited in the file of this patent

UNITED STATES PATENTS

| | | |
|---|---|---|
| 1,129,182 | Ehrhardt et al. | Feb. 23, 1915 |
| 1,375,544 | Weatherly et al. | Apr. 19, 1921 |
| 1,802,936 | Bekk | Apr. 28, 1931 |
| 2,112,416 | Dewberry | Mar. 29, 1938 |
| 2,222,251 | Calkins et al. | Nov. 19, 1940 |
| 2,297,691 | Carlson | Oct. 6, 1942 |
| 2,428,307 | Calton | Sept. 30, 1947 |
| 2,480,711 | Calton | Aug. 30, 1949 |
| 2,651,702 | Burke et al. | Sept. 8, 1953 |
| 2,653,394 | Nelson | Sept. 29, 1953 |
| 2,704,512 | Alexander | Mar. 22, 1955 |

UNITED STATES PATENT OFFICE

CERTIFICATE OF CORRECTION

Patent No. 2,922,716

January 26, 1960

Frederick Nathan

It is hereby certified that error appears in the printed specification of the above numbered patent requiring correction and that the said Letters Patent should read as corrected below.

Column 4, line 36, for "contract" read -- contact --.

Signed and sealed this 23rd day of August 1960.

(SEAL)
Attest:

KARL H. AXLINE
Attesting Officer

ROBERT C. WATSON
Commissioner of Patents